United States Patent
Behrendt et al.

Patent Number: 6,035,097
Date of Patent: Mar. 7, 2000

[54] ELECTRICAL HEATING UNIT WITH TWO CONCENTRICALLY DISPOSED HEATING ELEMENTS

[75] Inventors: Jürgen Behrendt, Idstein; Boris Wonka, Neu Isenburg; Wilfried Rolf, Runkel-Eschenau; Robert Jung, Friedberg, all of Germany

[73] Assignee: Braun GmbH, Frankfurt, Germany

[21] Appl. No.: 09/058,380

[22] Filed: Apr. 9, 1998

Related U.S. Application Data

[63] Continuation of application No. PCT/EP97/03476, Jul. 2, 1997.

[30] Foreign Application Priority Data

Aug. 26, 1996 [DE] Germany .......................... 196 34 420

[51] Int. Cl.$^7$ ................................ H05B 1/00; F24H 3/00
[52] U.S. Cl. ........................ 392/380; 392/379; 392/360; 219/537; 219/542; 219/476
[58] Field of Search ................... 392/383–385, 392/379, 360, 365–369; 219/537, 542, 539, 476; 338/296–300, 302, 304, 305, 315, 317–319

[56] References Cited

U.S. PATENT DOCUMENTS

| | | |
|---|---|---|
| 1,714,167 | 5/1929 | Hardin . |
| 3,094,606 | 6/1963 | Ferris ........................................ 392/385 |
| 4,247,842 | 1/1981 | Bengsch et al. ......................... 392/360 |
| 4,300,280 | 11/1981 | Majthan et al. ......................... 392/384 |
| 4,350,872 | 9/1982 | Meywald et al. ....................... 392/379 |
| 4,896,020 | 1/1990 | Poweleit . |

FOREIGN PATENT DOCUMENTS

| | | |
|---|---|---|
| 7804359 | 4/1979 | Brazil . |
| 293 997 | 6/1988 | European Pat. Off. . |
| 1423881 | 11/1965 | France . |
| 2456489 | 1/1981 | France . |
| 248 792 | 7/1912 | Germany . |
| 410 879 | 3/1925 | Germany . |
| 10 80 744 | 4/1960 | Germany . |
| 2406768 | 8/1975 | Germany . |
| 73 06 153 | 4/1977 | Germany . |
| 3234012 | 3/1984 | Germany . |
| 88 01 056 | 7/1989 | Germany . |
| 93 05 195 | 7/1993 | Germany . |
| 62-14807 | 1/1987 | Japan . |
| 89511 | 6/1921 | Switzerland . |
| 210497 | 1/1924 | United Kingdom . |
| 1456782 | 11/1976 | United Kingdom . |
| 2181311 | 4/1987 | United Kingdom . |

*Primary Examiner*—John A. Jeffery
*Attorney, Agent, or Firm*—Edward S. Podszus

[57] ABSTRACT

An electrical heating unit, particularly for a hair drier, comprises a first wire heating element, in particular a spiral coil wire heating element (2) having a heat conductor support comprising at least one support plate (4, 5, 6), and a heat conductor winding (7) arranged thereon. This spiral coil wire heating element serves to heat the stream of air flowing through the hair drier. At least one second wire heating element is provided, serving the function of adapting the electrical voltage for a further electrical load, particularly as a series resistor, for a direct-current motor fitted with an impeller to produce the stream of air. The second wire heating element (3) comprises a frame-type heat conductor support (8) and a heat conductor winding (9) arranged thereon which fills the free area of cross section of the heat conductor support (8). Further, the second heating element (3) is secured to the first heating element (2).

17 Claims, 3 Drawing Sheets

ELECTRICAL HEATING UNIT WITH TWO CONCENTRICALLY DISPOSED HEATING ELEMENTS

This is a continuation application of International Application No. PCT/EP97/03476, pending, with an International filing date of Jul. 2, 1997.

This invention relates to an electrical heating unit, particularly for a hair drier, comprising a first and a second wire heating element. The first wire heating element is in particular a spiral coil wire heating element having a heat conductor support comprising at least one support plate and a heat conductor winding arranged thereon, and serves to heat the stream of air flowing through the hair drier. The second wire heating element serves the function of adapting the electrical voltage for a further electrical load, particularly as a series resistor, for example for a direct-current motor fitted with an impeller to produce the stream of air.

The majority of electrical hair driers are operated at the electrical line voltage, that is, at a voltage of between 100 and 240 Volts depending on the country. Conventionally, the electrical heating unit in a hair drier is connected directly to the line. A motor, usually a direct-current motor installed in the hair drier and fitted with an impeller, can, however, normally only be operated at a voltage which is significantly lower than the line voltage. For this reason, the hair driers are equipped with a device for adaptation, and in particular reduction, of the electrical voltage for the direct-current motor. The provision of, for example, a second heat conductor winding parallel to the first one as a series resistor for the direct-current motor, or the connection of a different type of resistor to the heating unit is an approach generally known in the art in order to provide the required motor voltage.

From JP 62-14807 an electrical heating unit incorporating the features hereinabove described is known, comprising a first heating element for heating the stream of air passing through the drier. A second wire heating element is arranged between the impeller motor and the heater, being designed to reduce the electrical voltage for the impeller motor. The second wire heating element of this specification comprises a strip-shaped support having a heat conductor wound onto its surface. After the heating wire is wound around the support, the support can be bent into a U, a circular ring or similar shape, with the heat conductor winding then extending substantially parallel to the direction of main flow.

In prior art heating units it has been found desirable for the hitherto known embodiments of a series resistor, for example for a direct-current motor, to improve flexibility under different conditions of production, for example with a view to achieving rapid adaptation of the electrical components to the given line voltage, and hence also reduce the manufacturing cost.

Accordingly, it is an object of the present invention to provide a novel, improved heating unit with a series resistor, for example in the form of a second wire heating element, for a direct-current motor, which enables improved flexibility and cost-efficiency in production. Another object of the invention is to provide a series resistor, particularly for a hair drier having a cooling stage, permitting the air discharge temperature to be at the lowest possible level.

According to the present invention, this object is met in an electrical heating unit of the type initially referred to, wherein the second heating element is designed to comprise a frame-type heat conductor support and a heat conductor winding arranged thereon which fills the free area of cross section of the heat conductor support, and the second heating element is attachable to the first heating element. This combination of a spiral coil wire heater with a second heating element having a frame-type heat conductor support—hereinafter briefly referred to as frame-type heater—enables a variable heating unit of modular design to be obtained for automated production, providing a large cross-sectional area that is covered by the heat conductor. This relatively large cross-sectional area which is arranged essentially transversely to the direction of main flow, advantageously provides for a nearly uniform temperature distribution over the entire cross-section through which the air can flow, resulting in only minimal heating of the air stream discharged from the hair drier when this frame-type heater is in operation. On the other hand, this modular design of spiral coil heater and frame-type heater presents an economical solution for the manufacture of an electrical heating unit. Particularly advantageously, such a combination of a spiral coil wire heating element and frame-type heater can be used in a hair drier having a cooling stage, as this frame-type heater, used as a series resistor for the motor, results in a relatively low heating of the air stream exiting from the air drier, compared to the total heating power of the hair drier. The attachment of the second heating element, particularly the frame-type heater, to the first heating element, that is, the spiral coil wire heater, advantageously enables a subassembly to be obtained which can be pre-assembled as a separate construction unit prior to its installation in the hair drier.

Another proposal involves arranging the second heating element within the outer contour of the first heating element. This has the advantage of obviating the need for substantial additional mounting space for the second heating element in a hair drier. On the other hand, however, the frame-type heater may occupy nearly all the cross-sectional area of the first heating element, that is, the spiral coil heater. As the heat conductor is thereby completely arranged in the air stream and surrounded by the stream of air, maximum cooling of the air stream is achieved. Hence, heat conductor wires having a small cross sectional area and a large thermal surface loading may be selected as heat conductor wires for the second heating element, that is, the frame-type heater.

In an advantageous embodiment of the heating unit, the heat conductor support of the first heating element is provided with slot-type recesses into which the second heating element is insertable. This presents a simple and economical solution for connecting the first and second heating elements, as these slots can be stamped out in one operation during the production of the support plates of the first heating element.

The slot-type recesses in the support plates of the first heating element are advantageously arranged essentially transversely to its main extension, thereby taking advantage of the maximum area of the heat conductor winding of the frame-type heater in the air stream.

In a particular configuration of the support plates of the first heating element, at least one of the slot-type recesses is provided with an open and a closed end. This advantageously permits the second wire heating element to be introduced into the open end of the slot and moved right up to the closed end, which serves as a stop for the frame-type heater. This arrangement thus affords the advantage of proposing a simple and low-cost design of the mounting structure for the frame-type heater and ease of assembly of the frame-type heater within the spiral coil wire heating element.

In an advantageous further feature of the heating unit, it is proposed that the frame-type heater include at least one male contact member which can be electrically connected to a female contact member on the heat conductor support of the first heating element when the heating element is introduced into the slot of the heat conductor support. A connection possibility is thereby provided which advantageously enables the first and the second heating element to be manufactured separately in a prior operation, and the second frame-type heating element to be simply mounted in the first heating element in a subsequent assembly operation. The plug-in contact between the first and the second heating element thus establishes an electrical connection to the first heating element in a very simple way directly when sliding in the frame-type heater, an approach which lends itself to automated production and eliminates the necessity of providing an electrical connection subsequently as, for example, by means of stranded wire.

In an advantageous further feature of the present invention, it is proposed that the heat conductor support of the second heating element or frame-type heater be a rectangular, in particular a square frame structure. A frame of this shape provides a heating element which is flexible with regard to the arrangement of different heat conductor windings, that is, it enables different wire thicknesses and different lengths of heat conductor to be wound onto the frame. On the other hand, the square shape of the frame provides a maximum possible area of the frame-type heater for arrangement in the stream of air with its usually round cross sectional area. This has the particular advantage of enabling the heat generated by the frame-type heater to be transferred to the air stream particularly uniformly, such that the increase in temperature to which the air stream is exposed is hardly noticeable to the user.

In a further feature of the present invention, it is proposed that the heat conductor winding of the second heating element be provided with a voltage tap, for example for the supply of power to the direct-current motor. This advantageously provides a further voltage divider within the frame-type heater for supplying the motor, the divider being capable of being connected for power supply to an attachment operable in conjunction with the hair drier.

In a further advantageous feature of the present invention, the second heating element, that is, the frame-type heater, is connected in series with a rectifier and a direct-current motor, and electrically connected to a power switch. Through this series connection, the frame-type heater, acting as a series resistor, is permanently connected to the direct-current motor so that the line power which is applied when the appliance is switched on is advantageously directly reduced by the frame-type heater to a voltage value as is required for operation of the direct-current motor, without the spiral coil wire heating element of the hair drier being required for operation of the motor.

The first heating element or spiral coil wire heating element is connected in parallel to the frame-type heater, the rectifier and the direct-current motor, and can be disconnected from the other components by means of a separate switch. This has the advantage of enabling the spiral coil wire heating element to be selectively connected to, or disconnected from, the direct-current motor generating the stream of air by the user direct, depending on whether a warm or a cool air stream is desired. See generally FIG. 3.

A further advantageous feature resides in designing the separate switch as a push-button switch, such as to establish an electrical connection between the frame-type heater and the spiral coil heater when in the non-actuated condition. The electrical heating unit of the hair drier thus normally produces a permanently warm air stream. When the user actuates the push-button, the electrical connection to the spiral coil heater is interrupted, with the attendant advantage of providing a cooling stage of the hair drier, producing a stream of only minimally heated air which is usually perceived to be cool by the user.

In a particularly advantageous further development of the present invention which may also represent an independent invention, the second wire heating element, that is, the frame-type heater, is provided for adaptation of the electrical voltage supplied to an attachment that is attachable to the hair drier equipped with this particular heating unit. Electrically powered implements, particularly for the styling and/or drying of hair, which are attached to the air outlet port of a hair drier, are known in the art. These implements feature an electrical load which is conventionally operated at a voltage different from, and usually lower than, the line voltage. In this manner the combination of a first and a second wire heating element as disclosed in this invention may be utilized to advantage as a heating unit for the hair drier for one purpose, and for another purpose as a series resistor for an electrical load, for example, a direct-current motor, provided in the attachment.

Of particular advantage is the configuration of an electrical hair drier comprising an electrical heating unit incorporating the features described in the foregoing.

Further features, advantages and application possibilities of the present invention will become apparent from the following description of embodiments illustrated in greater detail in the accompanying drawing. It will be understood that any single feature and any combination of single features described and/or represented by illustration form the subject-matter of the present invention, irrespective of their summary in the claims and their cross reference.

Figure 1:
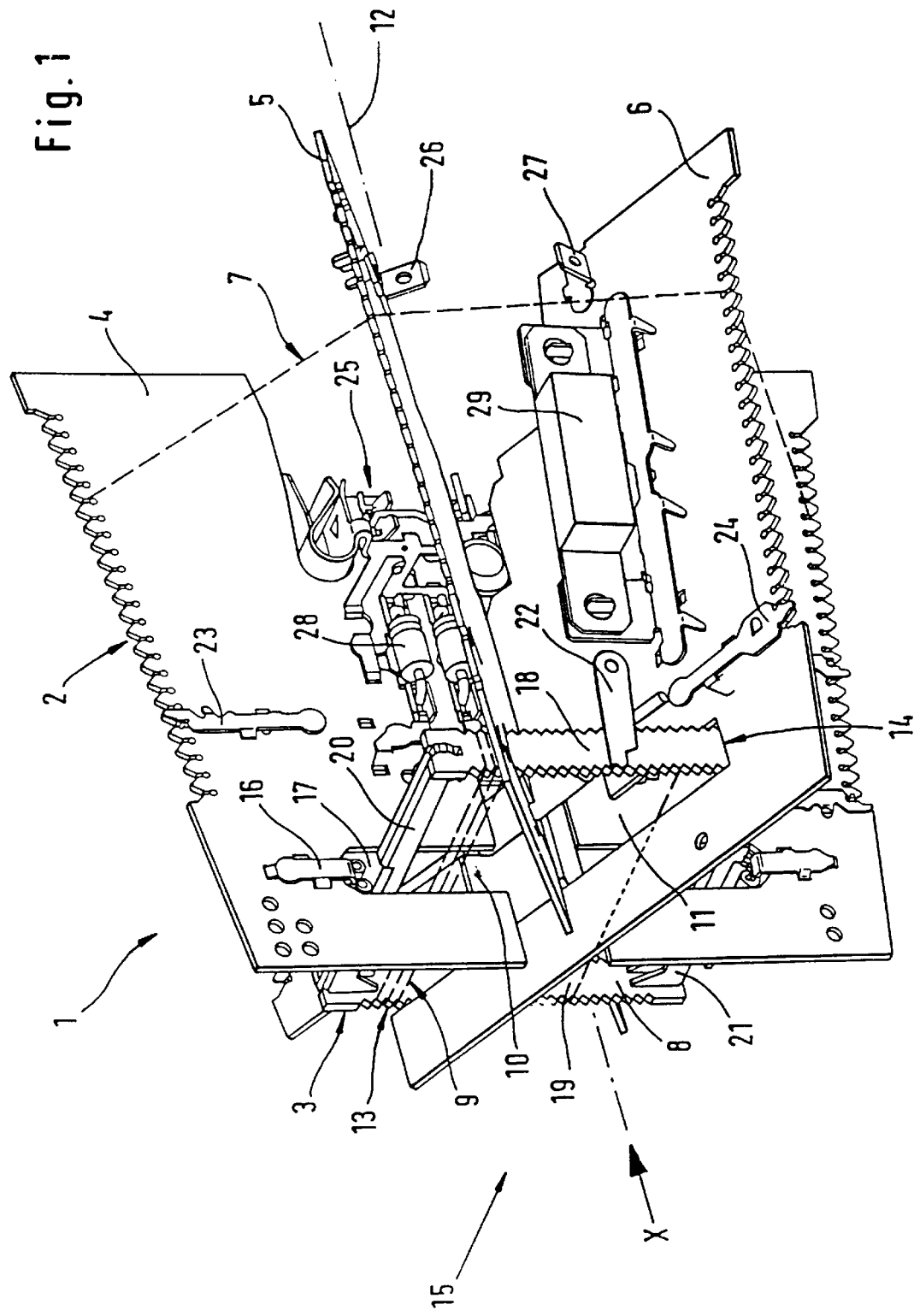
FIG. 1 is a perspective view of an electrical heating unit for a hair drier comprising a spiral coil heating element and a frame-type heating element.

An electrical heating unit 1 (FIG. 1) in accordance with the present invention, particularly for a hair drier, comprises a first heating element in the form of a spiral coil wire heating element 2, and a second heating element in the form of a frame-type wire heating element 3 arranged downstream from the spiral coil heater when looking in the direction of flow. The spiral coil wire heating element comprises three support plates 4, 5 and 6 combining to form a supporting structure for the heat conductors. A heat conductor winding 7, shown only schematically in FIG. 1 for the sake of simplicity, is wound around the outer edges of the support plates 4, 5 and 6.

The frame-type heater 3 comprises a heat conductor support 8 and a heat conductor winding 9. The heat conductor support 8 in turn comprises two identical support plates 18 and 19 made from an insulating material and provided with notches along their longitudinal edges to receive the heat conductor winding 9. Two strut members 20 and 21 are provided for maintaining the support plates 18 and 19 in spaced relation, such that the resulting free area of cross section of the frame-type support 8 is square. This entire free cross section of the support 8 is filled in grid fashion by the heat conductor winding 9, which is shown only schematically in the illustration for improved clarity.

The support plates 4, 5, 6 are provided at their downstream end, as seen in the direction of flow, with slots 10 and 11 arranged transversely to the direction of the main axis 12 of the spiral coil heater 2. The slot 11 in the support plate 6 has an open end 13 at a longitudinal side of the plate 6, and a closed end 14 at the opposite longitudinal side. The frame-type heater 3 can thus be inserted in the slot 11 in the mounting direction 15 transverse to the main axis 12 of the spiral coil heater 2, with the closed end 14 of the slot 11 acting as a stop. By means of a snap contact member 17 on the upper strut member 20 of the frame-type heater 3, the frame-type heater 3 engages simply with a snap action with a mating contact member 16 on the support plate 4 during its insertion. This establishes a mechanical and an electrical connection as the frame-type heater 3 is being inserted.

The front support plate 18 of the frame-type heater 3 may optionally be fitted with a voltage tap 22. On the support plates 4 and 6, the heat conductor 7 is electrically connected to voltage taps 23 and 24, respectively. The support plate 4 furthermore accommodates a compound contact element 25 which can be connected to the voltage taps 23, 24 on the one hand, and to a power supply of the heating unit 1 or a further electrical load as, for example, a direct-current motor, on the other hand. The compound contact element 25 moreover carries a rectifier 28. Secured to the ends of the support plates 5 and 6 is a contact member 26 and 27 respectively, for further electrical connection of the heating unit 1. Also mounted on the support plate 6 is a thermostatic switch 29 serving as a thermal protector for the heating unit 1.

Figure 2:
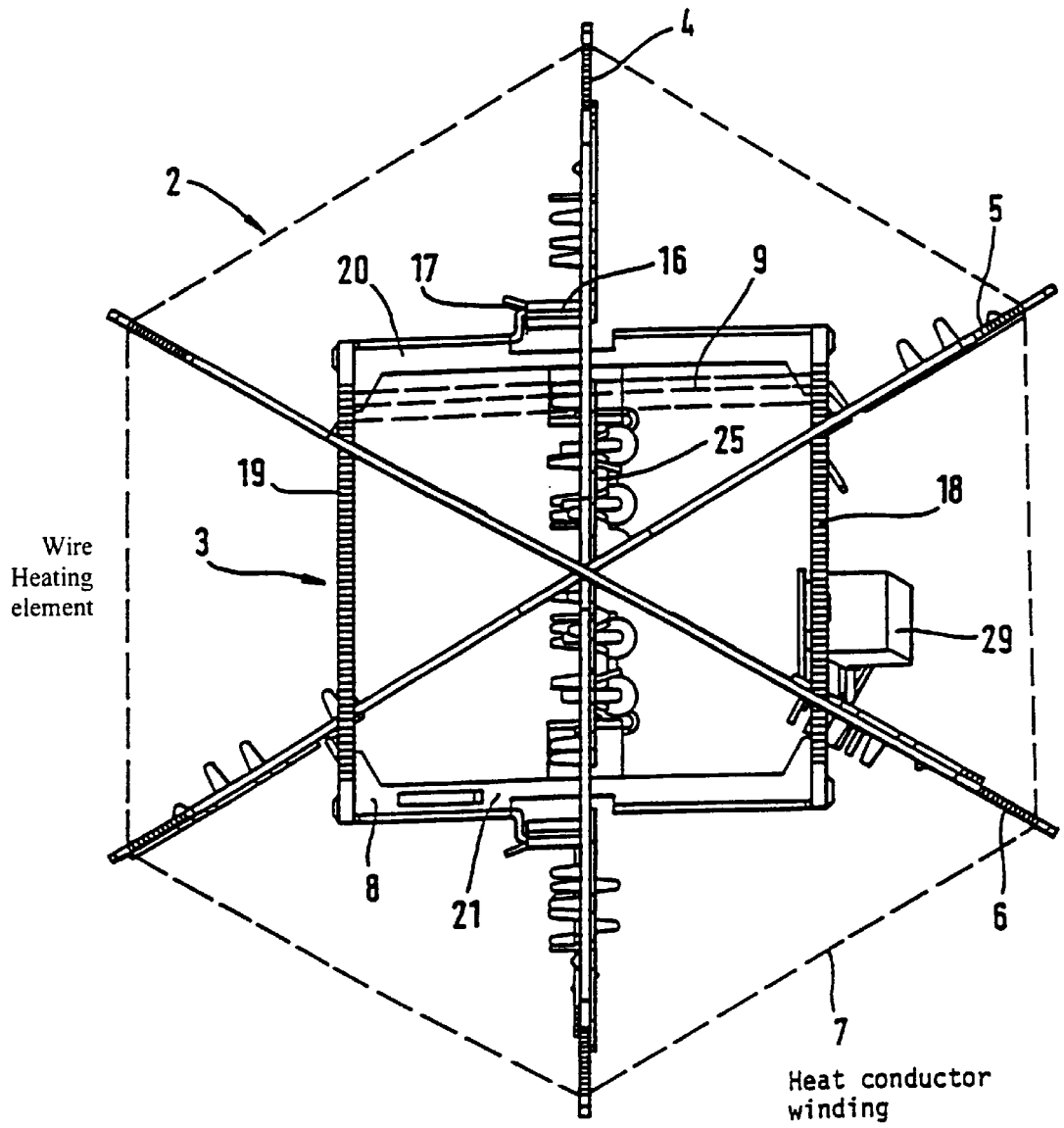
FIG. 2 is a side view of an electrical heating unit as seen looking from the direction X of FIG. 1.
Figure 3:
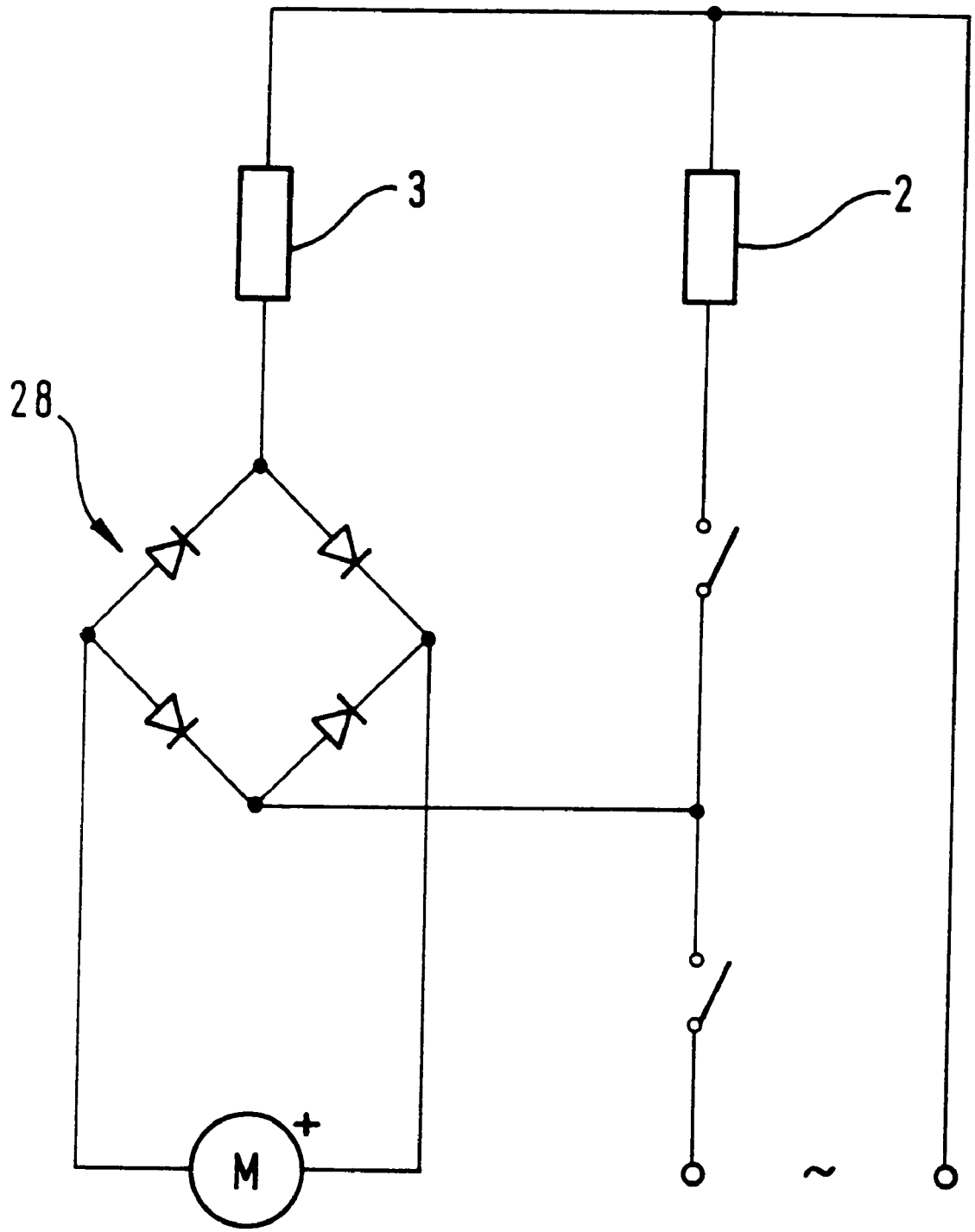
FIG. 3 is an electronic schematic diagram of the electrical heating unit of the invention.

A view X of the left-hand end of the heating unit 1 is shown in FIG. 2. This Figure shows the star-shaped arrangement of the support plates 4, 5, 6 on which the heat conductor 7 is wound. It will be appreciated, of course, that such a heat conductor support for a heating unit according to the present invention may also be made up from only one, or two, or more support plates.

The frame-type heater 3 with its square heat conductor support 8 is centrally arranged in the spiral coil heating element 2, snap contact members 17 connecting it to the mating contact member 16. The support plates 18, 19 combine with the strut members 20, 21 to form a square heat conductor support whose free cross section is filled in grid fashion by the heat conductor winding 9. The frame-type heater 3 may, of course, also have a shape other than the square frame shape shown, without adversely affecting the modular structure of the two heating elements and the large cross-sectional area produced by the frame-type heater.

In a preferred embodiment, the frame-type heater 3 (FIG. 1) is arranged downstream from the heat conductor winding 7, as seen in the direction of flow. It will be understood, however, that a frame-type heater may also be arranged at any other location within the heating unit 1. Equally, designing a heating unit with two or more frame-type heaters acting as series resistor for a direct-current motor is also possible. A further variation of the resistance values of the frame-type heater 3 may be achieved by using a heat conductor wire 9 with a different diameter or different material properties. Furthermore, the variation of the pitch, that is, the relative distance of the individual turns of the heat conductor winding 9, is a parameter for varying the resistance value of the frame-type heater 3.

We claim:

1. An electrical heating unit for an air-moving appliance, comprising
   a first wire heating element having a heat conductor support comprising at least one support plate and a heat conductor winding arranged thereon for heating a stream of air flowing through an air-moving appliance, and
   at least one second wire heating element for adapting an electrical voltage for a direct-current motor fitted with an impeller to produce the stream of air,
   wherein the second wire heating element comprises a frame-type heat conductor support and a heat conducting winding arranged thereon which substantially fills the lateral area of cross-section of the frame-type heat conductor support, and
   wherein the second heating element is arranged within an outer contour of the first heating element.

2. The electrical heating unit as claimed in claim 1 wherein the heat conductor support of the first heating element is provided with slot-type recesses, and the second heating element is disposed in said recesses.

3. The electrical heating unit as claimed in claim 2, wherein the slot-type recesses are arranged substantially transversely to a longitudinal extent of the first heating element.

4. The electrical heating unit as claimed in claim 1, wherein at least one said support plate has a slot-type recess with an open and a closed end, with the second wire heating element being insertable into the open end of the slot-type recess and the closed end providing a stop for the second heating element.

5. The electrical heating unit as claimed in claim 1, wherein the heat conductor support of the second heating element has a rectangular frame structure.

6. The electrical heating unit as claimed in claim 1, wherein the second heating element is connected in series with a rectifier and the direct-current motor, and electrically connected to a power switch.

7. The electrical heating unit as claimed in claim 1, wherein the first heating element is connected in parallel to the second heating element, a rectifier and the direct-current motor, and can be disconnected from the second heating element, the rectifier and the direct-current motor by a separate switch.

8. The electrical heating unit as claimed in claim 7, wherein the separate switch is a push-button switch.

9. The electrical heating unit as claimed in claim 1 in combination with an air-moving appliance, wherein the air-moving appliance is an electrical hair dryer.

10. The electrical heating unit of claim 1, wherein the first heating element is a spiral coil wire heating element.

11. The electrical heating unit of claim 1, wherein the second heating element is connected in series with the direct-current motor.

12. The electrical heating unit of claim 1, wherein the first heating element heat conductor support comprises three support plates having a longitudinal extent, said first heat conductor winding being wound thereon about an axis extending along the longitudinal extent, whereby the winding extends parallel with an air stream axis.

13. An electrical heating unit for an air-moving appliance, comprising
   a first wire heating element having a heat conductor support comprising at least one support plate and a heat conductor winding arranged thereon for heating a stream of air flowing through an air-moving appliance, and
   at least one second wire heating element for adapting an electrical voltage for a direct-current motor fitted with an impeller to produce the stream of air,
   wherein the second wire heating element comprises a frame-type heat conductor support and a heat conducting winding arranged thereon which fills the free area of cross-section of the heat conductor support, and the second heating element is attachable to the first heating element, and
   wherein the heat conductor winding of the second heating element is provided with a voltage tap for the supply of power to a second electrical load removably attached to and external of an air-moving appliance.

14. The electrical heating unit as claimed in claim 13 in combination with an air-moving appliance, wherein the air-moving appliance comprises an electrical hair dryer having a detachable electrically powered attachment wherein the second wire heating element voltage tap is provided for adaptation of the electrical voltage supplied to the attachment.

15. An electrical heating unit for an air-moving appliance, comprising a first wire heating element having a heat conductor support comprising at least one support plate and a heat conductor winding arranged thereon for heating a stream of air flowing through an air-moving appliance, and at least one second wire heating element for adapting an electrical voltage for a direct-current motor fitted with an impeller to produce the stream of air, wherein the second wire heating element comprises a frame-type heat conductor support and a heat conducting winding arranged thereon which is electrically and mechanically attachable to the first heating element, and wherein the second wire heating element is a separate subassambled module.

16. The electrical heating unit of claim 15, wherein said first and second wire heating elements are electrically attachable with one another by a plug-in connection.

17. An electrical heating unit for an air-moving appliance, comprising a first wire heating element having a heat conductor support comprising at least one support plate and a heat conductor winding arranged thereon for heating a stream of air flowing through an air-moving appliance, and at least one second wire heating element for adapting an electrical voltage for a direct-current motor fitted with an impeller to produce the stream of air, wherein the second wire heating element comprises a frame-type heat conductor support and a heat conducting winding arranged thereon which fills the free area of cross-section of the heat conductor support, and the second heating element is attachable to the first heating element, wherein the heat conductor support of one of the first and second wire heating elements is provided with slot-type recesses and the heat conductor support of the other of the first and second wire heating elements is interfit in said recesses, and wherein one of the first and second heating elements includes at least one male contact member which can be electrically connected to a female contact member on the heat conductor support of the other of the first and second heating elements when the second heating element is interfit into the first heating element.

* * * * *